United States Patent
Katou et al.

(10) Patent No.: US 9,464,174 B2
(45) Date of Patent: Oct. 11, 2016

(54) METHOD FOR MANUFACTURING RUBBER COMPOSITION

(75) Inventors: Seiichi Katou, Kodaira (JP); Satoshi Horie, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 129 days.

(21) Appl. No.: 13/877,028

(22) PCT Filed: Oct. 3, 2011

(86) PCT No.: PCT/JP2011/072794
§ 371 (c)(1),
(2), (4) Date: May 10, 2013

(87) PCT Pub. No.: WO2012/043858
PCT Pub. Date: Apr. 5, 2012

(65) Prior Publication Data
US 2013/0237637 A1    Sep. 12, 2013

(30) Foreign Application Priority Data

Oct. 1, 2010 (JP) ................................ 2010-224365

(51) Int. Cl.
| | | |
|---|---|---|
| *C08J 3/20* | (2006.01) | |
| *B60C 1/00* | (2006.01) | |
| *C08K 5/39* | (2006.01) | |
| *B29C 47/60* | (2006.01) | |
| *B29B 7/18* | (2006.01) | |
| *B29B 7/48* | (2006.01) | |
| *B29B 7/88* | (2006.01) | |

(52) U.S. Cl.
CPC .............. *C08J 3/20* (2013.01); *B29C 47/6056* (2013.01); *B60C 1/00* (2013.01); *B60C 1/0016* (2013.04); *C08K 5/39* (2013.01); *B29B 7/183* (2013.01); *B29B 7/48* (2013.01); *B29B 7/88* (2013.01)

(58) Field of Classification Search
CPC ............ C08K 5/39; B60C 1/0016; C08J 3/20
USPC .......................................... 523/351; 524/575
See application file for complete search history.

(56) References Cited

U.S. PATENT DOCUMENTS

| | | |
|---|---|---|
| 6,420,488 B1 | 7/2002 | Penot |
| 2001/0034389 A1 | 10/2001 | Vasseur |
| 2002/0188050 A1 | 12/2002 | Yagi et al. |
| 2003/0105242 A1 | 6/2003 | Penot |
| 2003/0144394 A1 | 7/2003 | Penot et al. |
| 2010/0105805 A1* | 4/2010 | Sasaka .......................... 523/150 |
| 2011/0306700 A1 | 12/2011 | Belin et al. |
| 2013/0231417 A1 | 9/2013 | Vasseur et al. |

FOREIGN PATENT DOCUMENTS

| | | | |
|---|---|---|---|
| EP | 0643098 | * | 3/1995 |
| JP | 7-165991 A | | 6/1995 |
| JP | 11-263882 A | | 9/1999 |
| JP | 2002-521515 A | | 7/2002 |
| JP | 2002-521516 A | | 7/2002 |
| JP | 2002-348412 A | | 12/2002 |
| JP | 2003-523472 A | | 8/2003 |
| JP | 2003-530443 A | | 10/2003 |
| WO | 96/30419 A1 | | 10/1996 |
| WO | 2008/123306 A1 | | 10/2008 |
| WO | 2010/072682 A1 | | 7/2010 |
| WO | 2011/138267 A1 | | 11/2011 |

OTHER PUBLICATIONS

Communication dated Sep. 4, 2015 from the European Patent Office in counterpart European Application No. 11829410.7.

* cited by examiner

*Primary Examiner* — Edward Cain
(74) *Attorney, Agent, or Firm* — Sughrue Mion, PLLC

(57) ABSTRACT

The present invention provides a method for producing a rubber composition containing a rubber component (A) of at least one selected from natural rubbers and synthetic dienic rubbers, an inorganic filler (B), a silane coupling agent (C) and an acidic compound (D), wherein the rubber composition is kneaded in multiple stages, and in the final stage of kneading, the acidic compound (D) is added, and the highest temperature of the rubber composition in the final stage of kneading is from 60 to 120° C. The production method enables production of a rubber composition having a low-heat-generation property while successfully preventing the coupling function activity of the silane coupling agent from lowering.

19 Claims, No Drawings

METHOD FOR MANUFACTURING RUBBER COMPOSITION

TECHNICAL FIELD

The present invention relates to a method for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of using an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, Patent Reference 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

Patent Reference 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

Patent Reference 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, Patent Reference 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

As a case of increasing the activity of the coupling function of a silane coupling agent in consideration of kneading conditions, there is mentioned Patent Reference 5; however, it is desired to further improve the effect of enhancing the activity of the coupling function of a silane coupling agent.

CITATION LIST

Patent References

Patent Reference 1: JP-T 2002-521515
Patent Reference 2: JP-T 2002-521516
Patent Reference 3: JP-T 2003-530443
Patent Reference 4: JP-T 2003-523472
Patent Reference 5: WO2008/123306

SUMMARY OF THE INVENTION

Problems that the Invention is to Solve

Given the situation as above, an object of the present invention is to provide a method for producing a rubber composition capable of further increasing the activity of the coupling function of a silane coupling agent to thereby successfully produce a low-heat-generating rubber composition.

Means for Solving the Problems

The present inventors have experimentally found that, in order to solve the above-mentioned problems, it is good to add an acidic compound in the final stage of the kneading step, and have completed the present invention.

Specifically, the present invention is a method for producing a rubber composition containing a rubber component (A) of at least one selected from natural rubbers and synthetic dienic rubbers, an inorganic filler (B), a silane coupling agent (C) and an acidic compound (D), wherein the rubber composition is kneaded in multiple stages, and in the final stage of kneading, the acidic compound (D) is added, and the highest temperature of the rubber composition in the final stage of kneading is from 60 to 120° C.

Advantage of the Invention

According to the present invention, there is provided a method for producing a rubber composition capable of further increasing the activity of the coupling function of a silane coupling agent to produce a rubber composition excellent in low-heat-generation property.

MODE FOR CARRYING OUT THE INVENTION

The present invention is described in detail hereinunder.

The method for producing a rubber composition of the present invention is a method for producing a rubber composition containing a rubber component (A) of at least one selected from natural rubbers and synthetic dienic rubbers, an inorganic filler (B), a silane coupling agent (C) and an acidic compound (D) (hereinafter this may be referred to as "acid compound"), wherein the rubber composition is kneaded in multiple stages, and in the final stage of kneading, the acidic compound (D) is added, and the highest temperature of the rubber composition in the final stage of kneading is from 60 to 120° C.

The acidic compound (D) is added in the final stage of kneading to thereby effectively prevent the activity of the coupling function of the silane coupling agent (C) with the rubber component (A) and the inorganic filler (B) from lowering, and, as a result, the activity of the coupling function of the silane coupling agent can be thereby effectively increased.

When the highest temperature of the rubber composition in the final stage of kneading is lower than 60° C., then much time would be taken for dispersion of the chemicals added in the final stage; but when higher than 120° C., then there is a problem in that the rubber composition would partially vulcanize during kneading.

When the highest temperature of the rubber composition in the final stage of kneading is from 80 to 120° C., then it is favorable since the dispersion of the chemicals is secured and the vulcanization does not start during kneading. More preferably, the temperature is from 100 to 120° C. from the viewpoint of enhancing the dispersibility of the chemicals.

In the rubber composition production method of the present invention, it is desirable that the highest temperature of the rubber composition in the first stage of kneading is from 120 to 190° C.

When the temperature is not lower than 120° C., then the coupling reaction could go on sufficiently; and when not higher than 190° C., then the unvulcanizate viscosity could be successfully prevented from increasing greatly and the workability of the rubber composition could better.

In the present invention, the first stage of kneading is the first stage of kneading the rubber component (A), all or a part of the inorganic filler (B) and all or a part of the silane coupling agent (C), but does not include a case of kneading the rubber component (A) and the other filler than the inorganic filler (B) in the initial stage and a case of pre-kneading the rubber component (A) alone.

Preferably, the kneading time for the first stage of kneading is from 10 seconds to 20 minutes, more preferably from 10 seconds to 10 minutes, even more preferably from 30 seconds to 5 minutes.

Also preferably, the kneading time for the final stage of kneading is from 10 seconds to 20 minutes, more preferably from 10 seconds to 10 minutes, even more preferably from 20 seconds to 5 minutes.

When the method goes on from a stage to the next stage, it is desirable that the temperature of the rubber composition is lowered by at least 10° C. than the temperature thereof at the end of kneading in the previous stage, and thereafter the rubber composition is processed in the next stage.

If desired, the method includes an intermediate stage between the first stage and the final stage of kneading.

[Acidic Compound (D)]

The acidic compound (D) for use in the rubber composition production method of the present invention is described in detail.

Not specifically defined, the acidic compound (D) for use in the present invention may be any acidic compound, but is preferably a mono- or poly-organic acid, or a partial ester of a poly-organic acid, or a metal salt of a mono- or poly-organic acid.

The mono-organic acid includes saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linolic acid, linolenic acid, nervonic acid, etc.; as well as resin acids such as rosin acids (abietic acid, neoabietic acid, dehydroabietic acid, paralustrinic acid, pimaric acid, isopimaric acid, etc.), modified rosin acids, etc.

The poly-organic acid includes unsaturated dicarboxylic acids or saturated dicarboxylic acids, as well as their partial esters (for example, monoesters) or acid anhydrides, etc.

The unsaturated dicarboxylic acid includes maleic acid, fumaric acid, citraconic acid, mesaconic acid, 2-pentene diacid, methylenesuccinic acid (itaconic acid), allylmalonic acid, isopropylidenesuccinic acid, 2,4-hexadiene diacid, acetylene-dicarboxylic acid, etc.; and the saturated dicarboxylic acid includes oxalic acid, malonic acid, succinic acid, glutaric acid, adipic acid, pimelic acid, suberic acid, azelaic acid, sebacic acid, tridecene diacid, methylsuccinic acid, 2,2-dimethylsuccinic acid, 2,3-dimethylsuccinic acid, tetramethylsuccinic acid, etc.

As the partial ester, preferably mentioned are (poly)esters of an unsaturated carboxylic acid and an oxycarboxylic acid; esters having a carboxyl group at both ends thereof, of a diol such as ethylene glycol, hexanediol, cyclohexanedimethanol or the like and an unsaturated dicarboxylic acid such as maleic acid, fumaric acid, itaconic acid or the like; etc.

The oxycarboxylic acid includes malic acid, tartaric acid, citric acid, etc.

The (poly)ester of an unsaturated carboxylic acid and an oxycarboxylic acid is preferably maleic acid monoesters, and more preferably monomalate of maleic acid.

The ester having a carboxyl group at both ends thereof, of a diol and an unsaturated dicarboxylic acid includes polyalkylene glycol/maleic acid polyester terminated with a carboxylic acid at both ends, such as polybutylene maleate having a carboxyl group at both ends thereof, poly(PEG200) maleate having a carboxyl group at both ends thereof, etc.; polybutylene adipate maleate having a carboxyl group at both ends thereof, etc.

In the present invention, the acidic compound (D) is preferably a fatty acid, more preferably a fatty acid having from 4 to 30 carbon atoms, even more preferably a fatty acid having from 6 to 26 carbon atoms. The fatty acid may be any of a saturated fatty acid or an unsaturated fatty acid, but is preferably a saturated fatty acid, more preferably stearic acid.

In the present invention, the acidic compound (D) must fully exhibit the function thereof as a vulcanization activator, and therefore the acidic compound (D) to be added in the final stage of kneading is preferably stearic acid.

[Silane Coupling Agent (C)]

The silane coupling agent (C) for use in the rubber composition production method of the present invention is preferably at least one compound selected from a group consisting of compounds of the following general formulae (I) to (IV).

Using the silane coupling agent (C) of the type, the rubber composition in the invention is excellent in workability thereof and can give pneumatic tires having good abrasion resistance.

The general formulae (I) to (IV) are sequentially described below.

[Chemical Formula 1]

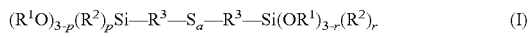
(I)

wherein multiple $R^1$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^2$'s may be the same or different, each representing a linear, cyclic or branched alkyl group having from 1 to 8 carbon atoms; multiple $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chemical Formula 2]

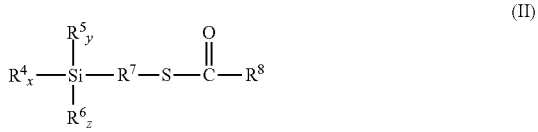

(II)

wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ (where $R^9$, $R^{10}$ and $R^{11}$ each represents a hydrogen atom or a monovalent hydrocarbon group having from 1 to 18 carbon atoms; and h indicates from 1 to 4 as a mean value); $R^5$ represents $R^4$, a hydrogen atom, or a hydrocarbon group having from 1 to 18 carbon atoms; $R^6$ represents $R^4$, $R^5$, a hydrogen atom, or a group —$[O(R^{12}O)_j]_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicates a number satisfying the relationship of x+y+2z=3, 0≤x≤3, 0≤y≤2, 0≤z≤1.

In the general formula (II), $R^8$, $R^9$, $R^{10}$ and $R^{11}$ may be the same or different, each preferably representing a linear, cyclic or branched alkyl, alkenyl, aryl or aralkyl group having from 1 to 18 carbon atoms. In case where $R^5$ is a monovalent hydrocarbon group having from 1 to 18 carbon atoms, the group is preferably a linear, cyclic or branched alkyl, alkenyl, aryl or aralkyl group. Preferably, $R^{12}$ is a linear, cyclic or branched alkylene group, and is more preferably a linear one. $R^7$ is, for example, an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms, or an aralkylene group having from 7 to 18 carbon atoms. The alkylene group and the alkenylene group may be linear or branched; and the cycloalkylene group, the cycloalkylalkylene group, the arylene group and the aralkylene group may have a substituent such as a lower alkyl group or the like on the ring thereof. Preferably, $R^7$ is an alkylene group having from 1 to 6 carbon atoms, more preferably a linear alkylene group, for example, a methylene group, an ethylene group, a trimethylene group, a tetramethylene group, a pentamethylene group or a hexamethylene group.

Specific examples of the monovalent hydrocarbon group having from 1 to 18 carbon atoms of $R^5$, $R^8$, $R^9$, $R^{10}$ and $R^{11}$ in the general formula (II) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, etc.

Examples of $R^{12}$ in the general formula (II) include a methylene group, an ethylene group, a trimethylene group, a tetramethylene group, a pentamethylene group, a hexamethylene group, an octamethylene group, a decamethylene group, a dodecamethylene group, etc.

Specific examples of the silane coupling agent (C) represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, etc. Of those, especially preferred is 3-octanoylthiopropyltriethoxysilane (General Electric Silicones' trade name NXT Silane).

[Chemical Formula 3]

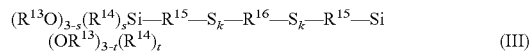

(III)

wherein multiple $R^{13}$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^{14}$'s may be the same or different, each representing a linear, cyclic or branched alkyl group having from 1 to 8 carbon atoms; multiple $R^{15}$'s may be the same or different, each representing a linear or branched alkylene group having from 1 to 8 carbon atoms; $R^{16}$ represents a divalent group of a general formula (—S—$R^{17}$—S—), (—$R^{18}$—$S_{m1}$—$R^{19}$—) or (—$R^{20}$—$S_{m2}$—$R^{21}$—$S_{m3}$—$R^{22}$—) (where $R^{17}$ to $R^{22}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); multiple k's may be the same or different, each indicating from 1 to 6 as a mean value; s and t each indicates from 0 to 3 as a mean value, provided that both s and t are not 3 at the same time.

Preferred examples of the silane coupling agent (C) represented by the above-mentioned general formula (III) are compounds represented by an average compositional formula $(CH_3CH_2O)_3Si$—$(CH_2)_3$—$S_2$—$(CH_2)_6$—$S_2$—$(CH_2)_3$—$Si(OCH_2CH_3)_3$, an average compositional formula $(CH_3CH_2O)_3Si-(CH_2)_3-S_2-(CH_2)_{10}-S_2-(CH_2)_3-Si(OCH_2CH_3)_3$, an average compositional formula $(CH_3CH_2O)_3Si-(CH_2)_3-S_3-(CH_2)_6-S_6-(CH_2)_3-Si(OCH_2CH_3)_3$, an average compositional formula $(CH_3CH_2O)_3Si-(CH_2)_3-S_4-(CH_2)_6-S_4-(CH_2)_3-Si(OCH_2CH_3)_3$, an average compositional formula $(CH_3CH_2O)_3Si-(CH_2)_3-S-(CH_2)_6-S_2-(CH_2)_6-S-(CH_2)_3-Si(OCH_2CH_3)_3$, an average compositional formula $(CH_3CH_2O)_3Si-(CH_2)_3-S-(CH_2)_6-S_{2.5}-(CH_2)_6-S-(CH_2)_3-Si(OCH_2CH_3)_3$, an average compositional formula $(CH_3CH_2O)_3Si-(CH_2)_3-S-(CH_2)_6-S_3-(CH_2)_6-S-(CH_2)_3-Si(OCH_2CH_3)_3$, an average compositional formula $(CH_3CH_2O)_3Si-(CH_2)_3-S-(CH_2)_6-S_4-(CH_2)_6-S-(CH_2)_3-Si(OCH_2CH_3)_3$, an average compositional formula $(CH_3CH_2O)_3S-(CH_2)_3-S-(CH_2)_{10}-S_2-(CH_2)_{10}-S-(CH_2)_3-Si(OCH_2CH_3)_3$, an average compositional formula $(CH_3CH_2O)_3Si-(CH_2)_3-S_4-(CH_2)_6-S_4-(CH_2)_6-S_4-(CH_2)_3-Si(OCH_2CH_3)_3$, an average compositional formula $(CH_3CH_2O)_3Si-(CH_2)_3-S_2-(CH_2)_6-S_2-(CH_2)_6-S_2-(CH_2)_3-Si(OCH_2CH_3)_3$, an average compositional formula $(CH_3CH_2O)_3Si-(CH_2)_3-S-(CH_2)_6-S_2-(CH_2)_6-S_2-(CH_2)_6-S-(CH_2)_3-Si(OCH_2CH_3)_3$, etc.

[Chemical Formula 4]

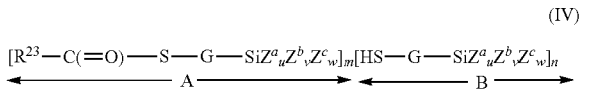

(IV)

wherein $R^{23}$ represents a linear, branched or cyclic alkyl group having from 1 to 20 carbon atoms; multiple G's may be the same or different, each representing an alkanediyl group or an alkenediyl group having from 1 to 9 carbon atoms; multiple $Z^a$'s may be the same or different, each representing a functional group capable of bonding to the two silicon atoms and selected from $[-O-]_{0.5}$, $[-O-G-]_{0.5}$ and $[-O-G-O-]_{0.5}$; multiple $Z^b$'s may be the same or different, each representing a functional group capable of bonding to the two silicon atoms and represented by $[-O-G-O-]_{0.5}$; multiple $Z^c$'s may be the same or different, each representing a functional group selected from $-Cl$, $-Br$, $-OR^a$, $R^aC(=O)O-$, $R^aR^bC=NO-$, $R^aR^bN-$, $R^a-$ and $HO-G-O-$ (where G is the same as above); $R^a$ and $R^b$ each represents a linear, branched or cyclic alkyl group having from 1 to 20 carbon atoms; m, n, u, v and w each are $1 \leq m \leq 20$, $0 \leq n \leq 20$, $0 \leq u \leq 3$, $0 \leq v \leq 2$, $0 \leq w \leq 1$, and $(u/2)+v+2w$ is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's.

Specific examples of the silane coupling agent (C) represented by the general formula (IV) include the following chemical formula (V), chemical formula (VI) and chemical formula (VII):

[Chemical Formula 5]

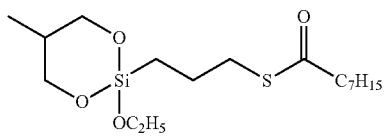

(V)

[Chemical Formula 6]

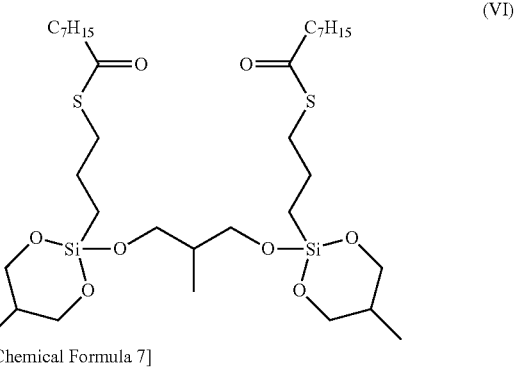

(VI)

[Chemical Formula 7]

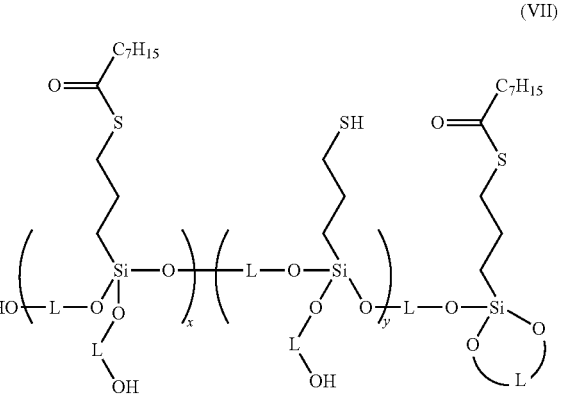

(VII)

In the formula, L each independently represents an alkanediyl group or an alkenediyl group having from 1 to 9 carbon atoms; and x=m and y=n.

As the silane coupling agent represented by the chemical formula (V), a commercial product is available as "NXT Low-V Silane", a trade name by Momentive Performance Materials.

As the silane coupling agent represented by the chemical formula (VI), a commercial product is available as "NXT Ultra Low-V Silane", a trade name by Momentive Performance Materials.

Further, as the silane coupling agent represented by the chemical formula (VII), there is mentioned a commercial product of "NXT-Z", a trade name by Momentive Performance Materials.

The silane coupling agent represented by the general formula (II), the chemical formula (V) or the chemical formula (VI) has a protected mercapto group, and is therefore effective for preventing initial scorching in the processing process before the vulcanization step, and accordingly, the processability thereof is good.

In the silane coupling agent represented by the general formula (V), (VI) or (VII), the carbon number of the alkoxysilane is large, and therefore the amount of the volatile compound VOC (especially alcohol) to be generated from the agent is small, and accordingly, the agent is favorable in point of working environment. Further, the silane coupling agent of the chemical formula (VII) provides a low-heat-generation property as tire performance, and is therefore more preferred.

With respect to the silane coupling agent (C) of the present invention, the compounds represented by the above-mentioned general formula (I), among the compounds represented by the general formulae (I) to (IV), are especially preferred as having high reactivity.

In the present invention, one alone or two or more different types of the silane coupling agents (C) may be used either singly or as combined.

Regarding the amount of the silane coupling agent (C) to be in the rubber composition in the present invention, preferably, the ratio by mass of {silane coupling agent (C)/inorganic filler (B)} is from (1/100) to (20/100). When the ratio is at least (1/100), then the effect of enhancing the low-heat-generation property of the rubber composition can be more successfully exhibited; and when at most (20/100), the cost of the rubber composition is low and the economic potential thereof increases. Further, the ratio by mass is more preferably from (3/100) to (20/100), even more preferably from (4/100) to (10/100).

[Vulcanization Promoter (E)]

In the production method of the present invention, it is desirable to add at least one vulcanization promoter (E) selected from guanidines, sulfenamides, thiazoles, thiurams, dithiocarbamate salts, thioureas and xanthate salts in the stage before the final stage of kneading for enhancing the reactivity of the coupling agent.

The vulcanization promoter (E) is described in detail.

The guanidines for use in the rubber composition production method of the present invention include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, 1,3-di-o-cumenyl-2-propionylguanidine, etc. Preferred are 1,3-diphenylguanidine, 1,3-di-o-tolylguanidine and 1-o-tolylbiguanide as having high reactivity.

The sulfenamides for use in the rubber composition production method of the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulenamide, N,N-dimethyl-2-benzothiazolylsulenamide, N,N-diethyl-2-benzothiazolylsulenamide, N,N-dipropyl-2-benzothiazolylsulenamide, N,N-dibutyl-2-benzothiazolylsulenamide, N,N-dipentyl-2-benzothiazolylsulenamide, N,N-dihexyl-2-benzothiazolylsulenamide, N,N-dipentyl-2-benzothiazolylsulenamide, N,N-dioctyl-2-benzothiazolylsulenamide, N,N-di-2-ethylhexylbenzothiazolylsulfenamide, N-decyl-2-benzothiazolylsulenamide, N,N-didodecyl-2-benzothiazolylsulenamide, N,N-distearyl-2-benzothiazolylsulenamide, etc. Of those, preferred are N-cyclohexyl-2-benzothiazolylsulenamide and N-tert-butyl-2-benzothiazolylsulenamide, as having high reactivity.

The thiazoles for use in the rubber composition production method of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole, etc. Of those, preferred are 2-mercaptobenzothiazole and di-2-benzothiazolyl disulfide, as having high reactivity.

The thiurams for use in the rubber composition production method of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiurammonosulfide, tetranonylthiurammonosulfide, tetradecylthiuram monosulfide, tetradodecylthiuram monosulfide, tetrastearylthiuram monosulfide, tetrabenzylthiuram monosulfide, dipentamethylthiuram tetrasulfide, etc. Of those, preferred are tetrakis(2-ethylhexyl)thiuram disulfide and tetrabenzylthiuram disulfide, as having high reactivity.

The thioureas for use in the rubber composition production method of the present invention include N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, etc. Of those, preferred are N,N'-diethylthiourea, trimethylthiourea, N,N'-diphenylthiourea and N,N'-dimethylthiourea, as having high reactivity.

The dithiocarbamate salts for use in the rubber composition production method of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pent amethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pent amethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, etc. Of those, preferred are zinc dibenzyldithiocarbamate, zinc N-ethyl-N-phenyldithiocarbamate, zinc dimethyldithiocarbamate and copper dimethyldithiocarbamate, as having high reactivity.

The xanthate salts for use in the rubber composition production method of the present invention include zinc methylxanthate, zinc ethylxanthate, zinc propylxanthate, zinc isopropylxanthate, zinc butylxanthate, zinc pentylxanthate, zinc hexylxanthate, zinc heptylxanthate, zinc octylxanthate, zinc 2-ethylhexylxanthate, zinc decylxanthate, zinc dodecylxanthate, potassium methylxanthate, potassium ethylxanthate, potassium propylxanthate, potassium isopropylxanthate, potassium butylxanthate, potassium pentylxanthate, potassium hexylxanthate, potassium heptylxanthate, potassium octylxanthate, potassium 2-ethylhexylxanthate, potassium decylxanthate, potassium dodecylxanthate, sodium methylxanthate, sodium ethylxanthate, sodium propylxanthate, sodium isopropylxanthate, sodium butylxanthate, sodium pentylxanthate, sodium hexylxanthate, sodium heptylxanthate, sodium octylxanthate, sodium 2-ethylhexylxanthate, sodium decylxanthate, sodium dodecylxanthate, etc. Of those, preferred is zinc isopropylxanthate, as having high reactivity.

In the rubber composition production method of the present invention, it is desirable that the rubber component (A), all or a part of the inorganic filler (B) and all or a part of the silane coupling agent (C) are kneaded in the first stage of kneading, and on the way of the first stage, the vulcanization promoter (E) is added and further kneaded, as the reactivity of the silane coupling agent can be enhanced in the embodiment.

It is also desirable that the rubber component (A), all or a part of the inorganic filler (B) and all or a part of the silane coupling agent (C) are kneaded in the first stage of kneading, and the vulcanization promoter (E) is added and kneaded in the second stage of kneading, for the same reason as above.

In case where the vulcanization promoter (E) is added in the first stage of kneading in the present invention, preferably, the number of molecules (molar number) of the vulcanization promoter (E) in the rubber composition is from 0.1 to 1.0 times the number of molecules (molar number) of the silane coupling agent (C). When the molar number is at least 0.1 times, then the silane coupling agent (C) can be fully activated; and when at most 1.0 time, then the agent would not have any significant influence on the vulcanization speed. More preferably, the number of molecules (molar number) of the vulcanization promoter (E) is from 0.2 to 0.6 times the number of molecules (molar number) of the silane coupling agent (C).

The vulcanization promoter (E) may act also as a promoter for sulfur vulcanization, and if desired, a suitable amount thereof may be incorporated also in the final stage of kneading. In case where a vulcanization promoter is incorporated in the final stage of kneading, the agent is not limited to the vulcanization promoter (E) of the present invention but may be any known vulcanization promoter.

[Rubber Component (A)]

As the synthetic dienic rubber of the rubber component (A) for use in the rubber composition production method of the present invention, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One or more different types of natural rubbers and synthetic dienic rubbers may be used here either singly or as combined.

In the rubber composition production method of the present invention, it is desirable that a synthetic rubber produced according to a solution polymerization method (for example, solution-polymerized SBR, solution-polymerized BR, etc.) accounts for at least 70% by mass of the rubber component (A), more preferably at least 80% by mass, even more preferably at least 90% by mass. Especially preferably, the rubber component (A) is entirely a synthetic rubber produced according to a solution polymerization method. This is in order to reduce the influence of the acidic compound (D) derived from the emulsifier contained in the synthetic rubber produced according to an emulsion polymerization method.

[Inorganic Filler (B)]

As the inorganic filler (B) for use in the rubber composition production method of the present invention, usable are silica and an inorganic compound represented by the following general formula (VIII):

$$dM^1 \cdot xSiO_y \cdot zH_2O \qquad \text{(VIII)}$$

In the general formula (VIII), $M^1$ represents at least one selected from a metal selected from aluminium, magnesium, titanium, calcium and zirconium, and oxides or hydroxides of those metals, their hydrates, or carbonates of the metals; d, x, y and z each indicates an integer of from 1 to 5, an integer of from 0 to 10, an integer of from 2 to 5, and an integer of from 0 to 10, respectively.

In the general formula (VIII), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable here; and above all, preferred is wet silica, dry silica or colloidal silica, and more preferred is wet silica. Preferably, the BET specific surface area (as measured according to ISO 5794/1) of silica for use herein is from 40 to 350 $m^2/g$. Silica of which the BET specific surface area falls within the range is advantageous in that it satisfies both rubber-reinforcing capability and dispersibility in rubber component. From this viewpoint, silica of which the BET specific surface area falls within a range of from 80 to 350 $m^2/g$ is more preferred; silica of which the BET specific surface area falls within a range of more than 130 $m^2/g$ to 350 $m^2/g$ is even more preferred; and silica of which the BET specific surface area falls within a range of from 135 to 350 $m^2/g$ is even more preferred. As silicas of those types, usable here are commercial products of Tosoh Silica's trade names "Nipseal AQ" (BET specific surface area=205 $m^2/g$) and "Nipseal KQ" (BET specific surface area=240 $m^2/g$); Degussa's trade name "Ultrasil VN3" (BET specific surface area=175 $m^2/g$), etc.

As the inorganic compound represented by the general formula (VIII), usable here are alumina ($Al_2O_3$) such as γ-alumina, α-alumina, etc.; alumina monohydrate ($Al_2O_3 \cdot H_2O$) such as boehmite, diaspore, etc.; aluminium hydroxide [$Al(OH)_3$] such as gypsite, bayerite, etc.; aluminium carbonate [Al$_2$(CO$_3$)$_2$], magnesium hydroxide [Mg(OH)$_2$], magnesium oxide (MgO), magnesium carbonate (MgCO$_3$), talc (3MgO.4SiO$_2$.H$_2$O), attapulgite (5MgO.8SiO$_2$.9H$_2$O), titanium white (TiO$_2$), titanium black (TiO$_{2n-1}$) calcium oxide (CaO), calcium hydroxide [Ca(OH)$_2$], aluminium magnesium oxide (MgO.Al$_2$O$_3$) clay (Al$_2$O$_3$.2SiO$_2$), kaolin (Al$_2$O$_3$.2SiO$_2$.2H$_2$O), pyrophyllite (Al$_2$O$_3$.4SiO$_2$.H$_2$O), bentonite (Al$_2$O$_3$.4SiO$_2$.2H$_2$O), aluminium silicate (Al$_2$SiO$_5$, Al$_4$.3SiO$_4$.5H$_2$O, etc.), magnesium silicate (Mg$_2$SiO$_4$, MgSiO$_3$, etc.), calcium silicate (Ca$_2$.SiO$_4$, etc.), aluminium calcium silicate (Al$_2$O$_3$.CaO.2SiO$_2$, etc.), magnesium calcium silicate (CaMgSiO$_4$), calcium carbonate (CaCO$_3$), zirconium oxide (ZrO$_2$), zirconium hydroxide [ZrO(OH)$_2$.nH$_2$O], zirconium carbonate [Zr(CO$_3$)$_2$]; as well as crystalline aluminosilicate salts containing a charge-correcting hydrogen, alkali metal or alkaline earth metal such as various types of zeolite. Preferably, M$^3$ in the general formula (5) is at least one selected from aluminium metal, aluminium oxide or hydroxide, and their hydrates, or aluminium carbonate.

One or more different types of the inorganic compounds of the general formula (VIII) may be used here either singly or as combined. The mean particle size of the inorganic compound is preferably within a range of from 0.01 to 10 µm from the viewpoint of the balance of kneading workability, abrasion resistance and wet grip performance, and more preferably within a range of from 0.05 to 5 µm.

As the inorganic filler (B) in the present invention, silica alone may be used, or silica as combined with at least one inorganic compound of the general formula (VIII) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area (N$_2$SA, as measured according to JIS K 6217-2:2001) of such carbon black is from 30 to 250 m$^2$/g. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of reducing rolling resistance. Further, the amount is more preferably from 30 to 100 parts by mass.

Also preferably, the inorganic filler (B) or a filler comprising the inorganic filler (B) and carbon black or the like in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of reducing rolling resistance.

In the filler, preferably, the amount of the inorganic filler (B) is at least 30% by mass from the viewpoint of satisfying both wet performance and reduced rolling resistance, more preferably at least 40% by mass, and even more preferably at least 70% by mass.

In case where silica is used as the inorganic filler (B), it is desirable that silica accounts for at least 30% by mass of the filler, more preferably at least 35% by mass.

In the rubber composition production method of the present invention, various additives that are generally incorporated in a rubber composition, for example, a vulcanization activator such as zinc flower or the like, an antiaging agent and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, a kneader, a double-screw extruder, etc.

EXAMPLES

The present invention is described in more detail with reference to the following Examples; however, the present invention is not limited at all by the following Examples.

Low-heat-generating property (tan δ index) was evaluated according to the following method.

Low-Heat-Generation Property (Tan δ Index)

Using a viscoelasticity measuring device (by Rheometric), tan δ of the rubber composition sample was measured at a temperature of 60° C., at a dynamic strain of 5% and at a frequency of 15 Hz. Based on the reciprocal of tan δ in Comparative Example 1, 23, 30, 38, 46 or 54, as referred to 100, the data were expressed as index indication according to the following formula. The samples having a larger index value have a better low-heat-generation property and have a smaller hysteresis loss.

Low-Heat-Generation Index={(tan δ of vulcanized rubber composition of Comparative Example 1, 23, 30, 38, 46 or 54)/(tan δ of vulcanized rubber composition tested)}×100

Production Example 1

Production of Silane Coupling Agent Represented by Average Compositional Formula (CH$_3$CH$_2$O)$_3$Si—(CH$_2$)$_3$—S—(CH$_2$)$_6$—S$_{2.5}$—(CH$_2$)$_6$—S—(CH$_2$)$_3$—Si(OCH$_2$CH$_3$)$_3$ 119 g (0.5 mol) of 3-mercaptopropyltriethoxysilane was put into a 2-liter separable flask equipped with a nitrogen-introducing duct, a thermometer, a Dimroth condenser and a dropping funnel, and with stirring, 151.2 g (0.45 mol) of an ethanol solution of sodium ethoxide having an effective ingredient concentration of 20% by mass was added thereto. Subsequently, this was heated up to 80° C. and stirred for 3 hours. Afterwards, this was cooled and transferred into a dropping funnel.

Next, 69.75 g (0.45 mol) of 1,6-dichlorohexane was put into the same separable flask as above, heated up to 80° C., and the reaction product of 3-mercaptopropyltriethoxysilane and sodium ethoxide was slowly and dropwise added thereto. After the addition, this was stirred for 5 hours at 80° C. Subsequently, this was cooled, and salt was separated from the obtained solution through filtration, and ethanol and excessive 1,6-dichlorohexane were removed therefrom through reduced-pressure distillation. The obtained solution was distilled under reduced pressure to give 137.7 g of a colorless transparent liquid having a boiling point of 148 to 150° C./0.005 Torr (0.67 Pa). As a result of IR analysis, $^1$H-NMR analysis and mass spectrometry analysis (MS analysis), the product was a compound represented by $(CH_3CH_2O)_3Si$—$(CH_2)_3$—$S$—$(CH_2)_6$—$Cl$. Through gas chromatography analysis (GC analysis), the purity of the compound was 97.5%.

Next, 80 g of ethanol, 5.46 g (0.07 mol) of anhydrous sodium sulfide and 3.36 g (0.105 mol) of sulfur were put into a 0.5-liter separable flask similar to the above, and heated up to 80° C. With stirring the solution, 49.91 g (0.14 mol) of the above $(CH_3CH_2O)_3Si$—$(CH_2)_3$—$S$—$(CH_2)_6$—$Cl$ was gradually and dropwise added thereto. After the addition, this was stirred for 10 hours at 80° C. After the stirring, this was cooled, the formed salt was taken out through filtration, and then the solvent ethanol was evaporated away under reduced pressure.

The obtained, red-brown transparent solution was analyzed through IR analysis, $^1$H-NMR analysis and ultra-critical chromatography analysis, which confirmed that the product is a compound represented by an average compositional formula, $(CH_3CH_2O)_3Si$—$(CH_2)_3$—$S$—$(CH_2)_6$—$S_{2.5}$—$(CH_2)_6$—$S$—$(CH_2)_3$—$Si(OCH_2CH_3)_3$. In GPC analysis, the purity of the product was 85.2%.

Examples 1 to 109 and Comparative Examples 1 to 61

According to the compositional formulation and the kneading method shown in Table 1 to Table 13, the ingredients were kneaded with a Banbury mixer to prepare 170 types of rubber compositions. In Examples 1 to 66, 71 to 109 and Comparative Examples 1 to 61, the ingredients were kneaded in two stages of the first stage and the final stage of kneading; and in Examples 67 to 70, the ingredients were kneaded in three stages of the first stage, the second stage and the final stage of kneading. In Examples 62 to 66, the rubber component, silica, and the silane coupling agent were mixed and kneaded in the first stage of kneading, and on the way of the first stage, the vulcanization promoter (E) was added and further kneaded. Table 6 shows the elapsed time after addition of the silane coupling agent and before addition of the vulcanization promoter (E) on the way of the first stage. The obtained 170 rubber compositions were evaluated in point of the low-heat-generation property (tan δ index) thereof according to the above-mentioned method. The results are shown in Table 1 to Table 13.

*1 to *38 in Table 1 to Table 13 are described in [Notes] given below. In Table 1 to Table 13, the acidic compound (D) is expressed as "acid compound"

TABLE 1

| | | | \multicolumn{8}{c|}{Example} |
|---|---|---|---|---|---|---|---|---|---|---|
| | | part by mass | 1 | 2 | 3 | 4 | 5 | 6 | 7 | 8 |
| For-mulation | First Stage of Kneading | Solution-Polymerized SBR-1 *1 | 100 | 100 | 100 | 100 | 100 | 100 | 100 | 100 |
| | | Carbon Black-1 N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid *5 | — | — | — | — | — | — | — | — |
| | | Maleic Acid Monoester *6 | — | — | — | — | — | — | — | — |
| | | Antiaging Agent 6PPD *7 | 1.0 | 1.0 | 1.0 | 1.0 | 1.0 | 1.0 | 1.0 | 1.0 |
| | Final Stage of Kneading | Stearic Acid *5 | 2.0 | 2.0 | 2.0 | 2.0 | 2.0 | 2.0 | 2.0 | 2.0 |
| | | Maleic Acid Monoester *6 | — | 2.0 | — | 2.0 | — | 2.0 | — | 2.0 |
| | | Antiaging Agent TMDQ *8 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 |
| | | 1,3-Diphenylguanidine *9 | 1.0 | 1.0 | 1.0 | 1.0 | 1.0 | 1.0 | 1.0 | 1.0 |
| | | Vulcanization Promoter MBTS *10 | 1.0 | 1.0 | 1.0 | 1.0 | 1.0 | 1.0 | 1.0 | 1.0 |
| | | Vulcanization Promoter TBBS *11 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| \multicolumn{3}{|l|}{Highest Temperature of Rubber Composition in Final Stage of Kneading (° C.)} | 105 | 105 | 75 | 75 | 85 | 85 | 115 | 115 |
| \multicolumn{3}{|l|}{Type of Acid Compound Added in First Stage of Kneading *5: Stearic Acid *6: Maleic Acid Monoester} | — | — | — | — | — | — | — | — |
| \multicolumn{3}{|l|}{Kneading Stage of Acid Compound Addition} | Final Stage | Final Stage | Final Stage | Final Stage | Final Stage | Final Stage | Final Stage | Final Stage |
| \multicolumn{3}{|l|}{Vulcanizate Physical Property: Low-Heat-Generation Property (tanδ index)} | 115 | 114 | 107 | 105 | 111 | 110 | 116 | 114 |

| | | | \multicolumn{8}{c|}{Comparative Example} |
|---|---|---|---|---|---|---|---|---|---|---|
| | | part by mass | 1 | 2 | 3 | 4 | 5 | 6 | 7 | 8 |
| For-mulation | First Stage of Kneading | Solution-Polymerized SBR-1 *1 | 100 | 100 | 100 | 100 | 100 | 100 | 100 | 100 |
| | | Carbon Black-1 N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid *5 | 2.0 | 2.0 | 2.0 | 2.0 | 2.0 | 2.0 | 2.0 | 2.0 |
| | | Maleic Acid Monoester *6 | — | 2.0 | — | 2.0 | — | 2.0 | — | 2.0 |
| | | Antiaging Agent 6PPD *7 | 1.0 | 1.0 | 1.0 | 1.0 | 1.0 | 1.0 | 1.0 | 1.0 |

TABLE 1-continued

| | | | | | | | | | |
|---|---|---|---|---|---|---|---|---|---|
| Final Stage of Kneading | Stearic Acid *5 | — | — | — | — | — | — | — | — |
| | Maleic Acid Monoester *6 | — | — | — | — | — | — | — | — |
| | Antiaging Agent TMDQ *8 | 1.0 | 1.0 | 1.0 | 1.0 | 1.0 | 1.0 | 1.0 | 1.0 |
| | Zinc Flower | 2.5 | 2.5 | 2.5 | 2.5 | 2.5 | 2.5 | 2.5 | 2.5 |
| | 1,3-Diphenylguanidine *9 | 1.0 | 1.0 | 1.0 | 1.0 | 1.0 | 1.0 | 1.0 | 1.0 |
| | Vulcanization Promoter MBTS *10 | 1.0 | 1.0 | 1.0 | 1.0 | 1.0 | 1.0 | 1.0 | 1.0 |
| | Vulcanization Promoter TBBS *11 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 |
| Highest Temperature of Rubber Composition in Final Stage of Kneading (° C.) | | 105 | 105 | 75 | 75 | 85 | 85 | 115 | 115 |
| Type of Acid Compound Added in First Stage of Kneading | | *5 | *5 | *5 | *5 | *5 | *5 | *5 | *5 |
| | | | *6 | | *6 | | *6 | | *6 |

*5: Stearic Acid
*6: Maleic Acid Monoester

| | | | | | | | | |
|---|---|---|---|---|---|---|---|---|
| Kneading Stage of Acid Compound Addition | First Stage | First Stage | First Stage | First Stage | First Stage | First Stage | First Stage | First Stage |
| Vulcanizate Physical Property: Low-Heat-Generation Property (tanδ index) | 100 | 99 | 99 | 98 | 100 | 100 | 98 | 98 |

TABLE 2

| Formulation | | part by mass | Example 1 | Example 2 | Example 9 | Example 10 | Example 11 | Example 12 | Example 13 | Example 14 | Example 15 | Example 16 | Comp. Ex. 1 | Comp. Ex. 2 | Comp. Ex. 9 |
|---|---|---|---|---|---|---|---|---|---|---|---|---|---|---|---|
| | First Stage of Kneading | Solution-Polymerized SBR-1 *1 | 100 | 100 | 100 | 100 | 100 | 100 | 100 | 100 | 100 | 100 | 100 | 100 | 100 |
| | | Carbon Black-1 N220 *2 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 | 30 | 30 |
| | | Stearic Acid *5 | — | — | — | — | — | — | — | — | — | — | 2.0 | 2.0 | 2.0 |
| | | Maleic Acid Monoester *6 | — | — | — | — | — | — | — | — | — | — | — | 2.0 | 2.0 |
| | | Valeric Acid *12 | — | — | — | — | — | — | — | — | — | — | — | — | — |
| | | Ascorbic Acid *13 | — | — | — | — | — | — | — | — | — | — | — | — | — |
| | | Catechol *14 | — | — | — | — | — | — | — | — | — | — | — | — | — |
| | | Phenol *15 | — | — | — | — | — | — | — | — | — | — | — | — | — |
| | | Phthalic Acid *16 | — | — | — | — | — | — | — | — | — | — | — | — | — |
| | | O-nitrophenol *17 | — | — | — | — | — | — | — | — | — | — | — | — | — |
| | | M-nitrophenol *18 | — | — | — | — | — | — | — | — | — | — | — | — | — |
| | | P-nitrophenol *19 | — | — | — | — | — | — | — | — | — | — | — | — | — |
| | | Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 |
| | Final Stage of Kneading | Stearic Acid *5 | 2.0 | 2.0 | 2.0 | 2.0 | 2.0 | 2.0 | 2.0 | 2.0 | 2.0 | 2.0 | — | — | 2.0 |
| | | Maleic Acid Monoester *6 | — | 2.0 | 2.0 | — | — | — | — | — | — | — | — | — | — |
| | | Valeric Acid *12 | — | — | — | 2.0 | — | — | — | — | — | — | — | — | — |
| | | Ascorbic Acid *13 | — | — | — | — | 2.0 | — | — | — | — | — | — | — | — |
| | | Catechol *14 | — | — | — | — | — | 1.0 | — | — | — | — | — | — | — |
| | | Phenol *15 | — | — | — | — | — | — | 1.0 | — | — | — | — | — | — |
| | | Phthalic Acid *16 | — | — | — | — | — | — | — | — | — | — | — | — | — |
| | | O-nitrophenol *17 | — | — | — | — | — | — | — | 1.0 | — | — | — | — | — |
| | | M-nitrophenol *18 | — | — | — | — | — | — | — | — | 1.0 | — | — | — | — |
| | | P-nitrophenol *19 | — | — | — | — | — | — | — | — | — | 1.0 | — | — | — |
| | | Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 |
| | | Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (°C) | | | 105 | 105 | 105 | 105 | 105 | 105 | 105 | 105 | 105 | 105 | 105 | 105 | 105 |
| Type of Acid Compound Added in First Stage of Kneading *5 to *19 | | | — | — | — | — | — | — | — | — | — | — | *5 | *5 *6 | *6 |
| Kneading Stage of Acid Compound Addition *5 to *19: Same as above | | | Final Stage | Final Stage | Final Stage | Final Stage | Final Stage | Final Stage | Final Stage | Final Stage | Final Stage | Final Stage | First Stage | First Stage | First Stage and Final Stage |
| Vulcanizate Physical Property: Low-Heat-Generation Property (tan δ index) | | | 115 | 114 | 115 | 115 | 117 | 114 | 113 | 114 | 114 | 114 | 100 | 99 | 102 |

TABLE 2-continued

| Formulation | part by mass | | Comparative Example | | | | | | | | | |
|---|---|---|---|---|---|---|---|---|---|---|---|---|
| | | | 10 | 11 | 12 | 13 | 14 | 15 | 16 | 17 | 18 | 19 |
| First Stage of Kneading | Solution-Polymerized SBR-1 *1 | | 100 | 100 | 100 | 100 | 100 | 100 | 100 | 100 | 100 | 100 |
| | Carbon Black-1 N220 *2 | | 10 | 10 | 10 | 10 | 10 | 10 | 10 | 10 | 10 | 10 |
| | Silica *3 | | 50 | 50 | 50 | 50 | 50 | 50 | 50 | 50 | 50 | 50 |
| | Silane Coupling Agent Si75 *4 | | 4.0 | 4.0 | 4.0 | 4.0 | 4.0 | 4.0 | 4.0 | 4.0 | 4.0 | 4.0 |
| | Aromatic Oil | | 30 | 30 | 30 | 30 | 30 | 30 | 30 | 30 | 30 | 30 |
| | Stearic Acid *5 | | 2.0 | — | 2.0 | — | — | — | — | — | — | — |
| | Maleic Acid Monoester *6 | | — | — | — | — | — | — | — | — | — | — |
| | Valeric Acid *12 | | — | — | — | — | — | — | — | — | — | — |
| | Ascorbic Acid *13 | | 2.0 | 2.0 | 2.0 | 2.0 | — | — | — | — | — | — |
| | Catechol *14 | | — | — | — | — | 2.0 | — | — | — | — | — |
| | Phenol *15 | | — | — | — | — | — | 1.0 | — | — | — | — |
| | Phthalic Acid *16 | | — | — | — | — | — | — | 1.0 | — | — | — |
| | O-nitrophenol *17 | | — | — | — | — | — | — | — | 1.0 | — | — |
| | M-nitrophenol *18 | | — | — | — | — | — | — | — | — | 1.0 | — |
| | P-nitrophenol *19 | | — | — | — | — | — | — | — | — | — | 1.0 |
| | Antiaging Agent 6PPD *7 | | 1.0 | 1.0 | 1.0 | 1.0 | 1.0 | 1.0 | 1.0 | 1.0 | 1.0 | 1.0 |
| Final Stage of Kneading | Stearic Acid *5 | | — | 2.0 | — | 2.0 | 2.0 | 2.0 | 2.0 | 2.0 | 2.0 | 2.0 |
| | Maleic Acid Monoester *6 | | — | — | — | — | — | — | — | — | — | — |
| | Valeric Acid *12 | | — | — | — | — | — | — | — | — | — | — |
| | Ascorbic Acid *13 | | — | — | — | — | — | — | — | — | — | — |
| | Catechol *14 | | — | — | — | — | — | — | — | — | — | — |
| | Phenol *15 | | — | — | — | — | — | — | — | — | — | — |
| | Phthalic Acid *16 | | — | — | — | — | — | — | — | — | — | — |
| | O-nitrophenol *17 | | — | — | — | — | — | — | — | — | — | — |
| | M-nitrophenol *18 | | — | — | — | — | — | — | — | — | — | — |
| | P-nitrophenol *19 | | — | — | — | — | — | — | — | — | — | — |
| | Antiaging Agent TMDQ *8 | | 1.0 | 1.0 | 1.0 | 1.0 | 1.0 | 1.0 | 1.0 | 1.0 | 1.0 | 1.0 |
| | Zinc Flower | | 2.5 | 2.5 | 2.5 | 2.5 | 2.5 | 2.5 | 2.5 | 2.5 | 2.5 | 2.5 |
| | 1,3-Diphenylguanidine *9 | | 1.0 | 1.0 | 1.0 | 1.0 | 1.0 | 1.0 | 1.0 | 1.0 | 1.0 | 1.0 |
| | Vulcanization Promoter MBTS *10 | | 1.0 | 1.0 | 1.0 | 1.0 | 1.0 | 1.0 | 1.0 | 1.0 | 1.0 | 1.0 |
| | Vulcanization Promoter TBBS *11 | | 0.6 | 0.6 | 0.6 | 0.6 | 0.6 | 0.6 | 0.6 | 0.6 | 0.6 | 0.6 |
| | Sulfur | | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | | | 105 | 105 | 105 | 105 | 105 | 105 | 105 | 105 | 105 | 105 |
| Type of Acid Compound Added in First Stage of Kneading *5 to *19: Same as above | | | *5 *12 | *12 | *5 *13 | *13 | *14 | *15 | *16 | *17 | *18 | *19 |
| Kneading Stage of Acid Compound Addition | | | First Stage | First Stage and Final Stage | First Stage | First Stage and Final Stage | First Stage and Final Stage | First Stage and Final Stage | First Stage and Final Stage | First Stage and Final Stage | First Stage and Final Stage | First Stage and Final Stage |
| Vulcanizate Physical Property: Low-Heat-Generation Property (tanδ index) | | | 98 | 100 | 100 | 103 | 104 | 104 | 102 | 104 | 104 | 103 |

TABLE 3

| part by mass | Example 17 | 18 | 19 | 20 | 21 | 22 | 23 | 24 | 25 | 26 | 27 | 28 | 29 | 30 | Comparative Example 1 |
|---|---|---|---|---|---|---|---|---|---|---|---|---|---|---|---|
| Formulation | | | | | | | | | | | | | | | |
| First Stage of Kneading | | | | | | | | | | | | | | | |
| Solution-Polymerized SBR-1 *1 | 100 | 100 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 | 10 | 10 |
| Silica *3 | 50 | 50 | 50 | 50 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 | 30 | 30 |
| Stearic Acid *5 | — | — | — | — | — | — | — | — | — | — | — | — | — | — | 2.0 |
| 1,3-Diphenylguanidine *9 | 1.0 | — | — | — | — | — | — | — | — | — | — | — | — | — | — |
| N-cyclohexyl-2-benzo-thiazolylsulfenamide *20 | — | 1.0 | — | — | — | — | — | — | — | — | — | — | — | — | — |
| N-tert-butyl-2-benzo-thiazolylsulfenamide *11 | — | — | 1.0 | — | — | — | — | — | — | — | — | — | — | — | — |
| 2-Mercaptobenzothiazole *21 | — | — | — | 0.6 | — | — | — | — | — | — | — | — | — | — | — |
| Di-2-benzothiazolyl Disulfide *10 | — | — | — | — | 1.0 | — | — | — | — | — | — | — | — | — | — |
| Tetrakis(2-ethylhexyl)thiuram Disulfide *22 | — | — | — | — | — | 1.0 | — | — | — | — | — | — | — | — | — |
| Tetrakis(benzyl)thiuram Disulfide *23 | — | — | — | — | — | — | 1.0 | — | — | — | — | — | — | — | — |
| Trimethylthiourea *24 | — | — | — | — | — | — | — | 1.0 | — | — | — | — | — | — | — |
| N,N'-diethylthiourea *25 | — | — | — | — | — | — | — | — | 1.0 | — | — | — | — | — | — |
| Zinc Dibenzyldithiocarbamate *26 | — | — | — | — | — | — | — | — | — | 1.0 | — | — | — | — | — |
| Zinc N-ethyl-N-phenyl-dithiocarbamate *27 | — | — | — | — | — | — | — | — | — | — | 1.0 | — | — | — | — |
| Zinc Dimethyldithiocarbamate *28 | — | — | — | — | — | — | — | — | — | — | — | 1.0 | — | — | — |
| Copper Dimethyl-dithiocarbamate *29 | — | — | — | — | — | — | — | — | — | — | — | — | 1.0 | — | — |
| Zinc Isopropylxanthate *30 | — | — | — | — | — | — | — | — | — | — | — | — | — | 1.0 | — |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | | | | | |
| Stearic Acid *5 | 2.0 | 2.0 | 2.0 | 2.0 | 2.0 | 2.0 | 2.0 | 2.0 | 2.0 | 2.0 | 2.0 | 2.0 | 2.0 | 2.0 | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | 105 | 105 | 105 | 105 | 105 | 105 | 105 | 105 | 105 | 105 | 105 | 105 | 105 | 105 | 105 |
| Type of Acid Compound Added in First Stage of Kneading | — | — | — | — | — | — | — | — | — | — | — | — | — | — | *5 |
| Kneading Stage of Acid Compound Addition | Final Stage | Final Stage | Final Stage | Final Stage | Final Stage | Final Stage | Final Stage | Final Stage | Final Stage | Final Stage | Final Stage | Final Stage | Final Stage | Final Stage | First Stage |
| Vulcanizate Physical Property: Low-Heat-Generation Property (tanδ index) | 128 | 121 | 123 | 127 | 122 | 121 | 123 | 119 | 119 | 131 | 130 | 133 | 125 | 128 | 100 |

*5: Stearic Acid

TABLE 4

| part by mass | Example 1 | 31 | 32 | 33 | 17 | 34 | 35 | 36 | 37 | 38 | 39 | 40 | Comparative Example 1 | 20 | 21 | 22 |
|---|---|---|---|---|---|---|---|---|---|---|---|---|---|---|---|---|
| Formulation | | | | | | | | | | | | | | | | |
| First Stage of Kneading | | | | | | | | | | | | | | | | |
| Solution-Polymerized SBR-1 *1 | 100 | 100 | 100 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 | 10 | 10 | 10 |
| Silica *3 | 50 | 50 | 50 | 50 | 50 | 50 | 50 | 50 | 50 | 50 | 50 | 50 | 50 | 50 | 50 | 50 |
| Silane Coupling Agent Si75 *4 | 4.0 | — | — | — | 4.0 | — | — | — | 4.0 | — | — | — | 4.0 | — | — | — |
| Silane Coupling Agent NXT *31 | — | 4.0 | — | — | — | 4.0 | — | — | — | 4.0 | — | — | — | 4.0 | — | — |
| Silane Coupling Agent NXT-Z *32 | — | — | 4.0 | — | — | — | 4.0 | — | — | — | 4.0 | — | — | — | 4.0 | — |

TABLE 4-continued

|  | Example |  |  |  |  |  |  |  |  |  |  |  | Comparative Example |  |  |  |
|---|---|---|---|---|---|---|---|---|---|---|---|---|---|---|---|---|
| part by mass | 1 | 31 | 32 | 33 | 17 | 34 | 35 | 36 | 37 | 38 | 39 | 40 | 1 | 20 | 21 | 22 |
| Silane Coupling Agent LCS *33 | — | — | — | 4.0 | — | — | — | 4.0 | — | — | — | 4.0 | — | — | — | 4.0 |
| Aromatic Oil | 30 | 30 | 30 | 30 | 30 | 30 | 30 | 30 | 30 | 30 | 30 | 30 | 30 | 30 | 30 | 30 |
| Stearic Acid *5 | — | — | — | — | — | — | — | — | — | — | — | — | 2.0 | 2.0 | 2.0 | 2.0 |
| 1,3-Diphenyl-guanidine *9 | — | — | — | — | 1.0 | 1.0 | 1.0 | 1.0 | — | — | — | — | — | — | — | — |
| 2-Mercapto-benzothiazole *21 | — | — | — | — | — | — | — | — | 0.5 | 0.5 | 0.5 | 0.5 | — | — | — | — |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading |  |  |  |  |  |  |  |  |  |  |  |  |  |  |  |  |
| Stearic Acid *5 | 2.0 | 2.0 | 2.0 | 2.0 | 2.0 | 2.0 | 2.0 | 2.0 | 2.0 | 2.0 | 2.0 | 2.0 | — | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenyl-guanidine *9 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | 105 | 105 | 105 | 105 | 105 | 105 | 105 | 105 | 105 | 105 | 105 | 105 | 105 | 105 | 105 | 105 |
| Type of Acid Compound Added in First Stage of Kneading *5: Stearic Acid | — | — | — | — | — | — | — | — | — | — | — | — | *5 | *5 | *5 | *5 |
| Kneading Stage of Acid Compound Addition | Final stage | Final stage | Final stage | Final stage | Final stage | Final stage | Final stage | Final stage | Final stage | Final stage | Final stage | Final stage | First Stage | First Stage | First Stage | First Stage |
| Vulcanizate Physical Property: Low-Heat-Generation Property (tanδ index) | 115 | 118 | 116 | 121 | 128 | 126 | 122 | 132 | 124 | 122 | 123 | 130 | 100 | 113 | 110 | 112 |

TABLE 5

Table 5-1

|  | Example |  |  |  |  |  |  |  |  |  |  |  |  |
|---|---|---|---|---|---|---|---|---|---|---|---|---|---|
| part by mass | 41 | 42 | 43 | 44 | 45 | 46 | 47 | 48 | 49 | 50 | 51 | 52 | 53 |
| Formulation First Stage of Kneading |  |  |  |  |  |  |  |  |  |  |  |  |  |
| Emulsion-Polymerized SBR-2 *34 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 |
| Silica *3 | 50 | 50 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 |
| Stearic Acid *5 | — | — | — | — | — | — | — | — | — | — | — | — | — |
| 1,3-Diphenylguanidine *9 | 1.0 | 1.0 | 1.0 | 1.0 | 1.0 | — | — | — | — | — | — | — | — |
| 2-Mercaptobenzothiazole *21 | — | — | — | — | — | 0.5 | 0.5 | 0.5 | 0.5 | — | — | — | — |
| Tetrakis(2-ethylhexyl)thiuram Disulfide *22 | — | — | — | — | — | — | — | — | — | 1.0 | 1.0 | 1.0 | 1.0 |
| Tetrakis(benzyl)thiuram Disulfide *23 | — | — | — | — | — | — | — | — | — | — | — | — | — |
| Zinc Dibenzyldithiocarbamate *26 | — | — | — | — | — | — | — | — | — | — | — | — | — |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading |  |  |  |  |  |  |  |  |  |  |  |  |  |
| Stearic Acid *5 | 2.0 | 2.0 | 2.0 | 2.0 | 2.0 | 2.0 | 2.0 | 2.0 | 2.0 | 2.0 | 2.0 | 2.0 | 2.0 |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | 150 | 170 | 190 | 110 | 120 | 140 | 150 | 170 | 190 | 140 | 150 | 170 | 190 |
| Highest Temperature of Rubber Composition in Final Stage of Kneading | 105 | 105 | 105 | 105 | 105 | 105 | 105 | 105 | 105 | 105 | 105 | 105 | 105 |

TABLE 5-continued

Table 5-1

| part by mass | Example |||||||||||||
|---|---|---|---|---|---|---|---|---|---|---|---|---|---|
| | 41 | 42 | 43 | 44 | 45 | 46 | 47 | 48 | 49 | 50 | 51 | 52 | 53 |
| Type of Acid Compound Added in First Stage of Kneading *5: Stearic Acid | — | — | — | — | — | — | — | — | — | — | — | — | — |
| Kneading Stage of Acid Compound Addition | Final Stage | Final Stage | Final Stage | Final Stage | Final Stage | Final Stage | Final Stage | Final Stage | Final Stage | Final Stage | Final Stage | Final Stage | Final Stage |
| Vulcanizate Physical Property: Low-Heat-Generation Property (tanδ index) | 115 | 120 | 122 | 109 | 111 | 115 | 118 | 120 | 120 | 112 | 116 | 117 | 117 |

TABLE 6

Table 5-2

| part by mass | Example ||||||||| Comparative Example |||
|---|---|---|---|---|---|---|---|---|---|---|---|
| | 54 | 55 | 56 | 57 | 58 | 59 | 60 | 61 | 23 | 24 | 25 |
| Formulation First Stage of Kneading | | | | | | | | | | | |
| Emulsion-Polymerized SBR-2 *34 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 |
| Silica *3 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 |
| Stearic Acid *5 | — | — | — | — | — | — | — | — | 2.0 | 2.0 | 2.0 |
| 1,3-Diphenylguanidine *9 | — | — | — | — | — | — | — | — | — | — | — |
| 2-Mercaptobenzothiazole *21 | — | — | — | — | — | — | — | — | — | — | — |
| Tetrakis(2-ethylhexyl)thiuram Disulfide *22 | — | — | — | — | — | — | — | — | — | — | — |
| Tetrakis(benzyl)thiuram Disulfide *23 | 1.0 | 1.0 | 1.0 | 1.0 | — | — | — | — | — | — | — |
| Zinc Dibenzyldithiocarbamate *26 | — | — | — | — | 1.0 | 1.0 | 1.0 | 1.0 | — | — | — |
| Antiaging Agent 6PPD *7 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | |
| Stearic Acid *5 | 2.0 | 2.0 | 2.0 | 2.0 | 2.0 | 2.0 | 2.0 | 2.0 | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | 140 | 150 | 170 | 190 | 140 | 150 | 170 | 190 | 150 | 160 | 170 |
| Highest Temperature of Rubber Composition in Final Stage of Kneading | 105 | 105 | 105 | 105 | 105 | 105 | 105 | 105 | 105 | 105 | 105 |
| Type of Acid Compound Added in First Stage of Kneading *5: Stearic Acid | — | — | — | — | — | — | — | — | *5 | *5 | *5 |
| Kneading Stage of Acid Compound Addition | Final Stage | Final Stage | Final Stage | Final Stage | Final Stage | Final Stage | Final Stage | Final Stage | Final Stage | Final Stage | Final Stage |
| Vulcanizate Physical Property: Low-Heat-Generation Property (tanδ index) | 114 | 115 | 117 | 118 | 119 | 124 | 125 | 127 | 100 | 101 | 103 |

TABLE 7

Table 6

| part by mass | Example ||||| Comparative Example 1 |
|---|---|---|---|---|---|---|
| | 62 | 63 | 64 | 65 | 66 | |
| Formulation First Stage of Kneading | | | | | | |
| Solution-Polymerized SBR-1 *1 | 100 | 100 | 100 | 100 | 100 | 100 |
| Carbon Black-1 N220 *2 | 10 | 10 | 10 | 10 | 10 | 10 |
| Silica *3 | 50 | 50 | 50 | 50 | 50 | 50 |
| Silane Coupling Agent Si75 *4 | 4.0 | 4.0 | 4.0 | 4.0 | 4.0 | 4.0 |

TABLE 7-continued

Table 6

| part by mass | Example 62 | Example 63 | Example 64 | Example 65 | Example 66 | Comparative Example 1 |
|---|---|---|---|---|---|---|
| Aromatic Oil | 30 | 30 | 30 | 30 | 30 | 30 |
| Stearic Acid *5 | — | — | — | — | — | 2 |
| Antiaging Agent 6PPD *7 | 1.0 | 1.0 | 1.0 | 1.0 | 1.0 | 1.0 |
| On the Way of First Stage of Kneading | | | | | | |
| 1,3-Diphenylguanidine *9 | 1.0 | 1.0 | — | — | — | — |
| Tetrakis(2-ethylhexyl)thiuram Disulfide *22 | — | — | 1.0 | — | — | — |
| Tetrakis(benzyl)thiuram Disulfide *23 | — | — | — | 1.0 | — | — |
| Zinc Dibenzyldithiocarbamate *26 | — | — | — | — | 1.0 | — |
| Final Stage of Kneading | | | | | | |
| Stearic Acid *5 | 2.0 | 2.0 | 2.0 | 2.0 | 2.0 | — |
| Antiaging Agent TMDQ *8 | 1.0 | 1.0 | 1.0 | 1.0 | 1.0 | 1.0 |
| Zinc Flower | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 |
| Sulfur | 1.5 | 1.5 | 1.5 | 1.5 | 1.5 | 1.5 |
| Elapsed Time after Addition of Silica and Silane Coupling Agent and before Addition of Vulcanization Promoter on the Way of First Stage of Kneading (sec) | 60 | 90 | 90 | 90 | 90 | — |
| Highest Temperature of Rubber Composition in Final Stage of Kneading (° C.) | 105 | 105 | 85 | 85 | 115 | 105 |
| Type of Acid Compound Added in First Stage of Kneading | — | — | — | — | — | *5 |
| *5: Stearic Acid | | | | | | |
| Kneading Stage of Acid Compound Addition | Final Stage | Final Stage | Final Stage | Final Stage | Final Stage | First Stage |
| Vulcanizate Physical Property: Low-Heat-Generation Property (tanδ index) | 125 | 134 | 126 | 127 | 133 | 100 |

TABLE 8

Table 7

| part by mass | Example 67 | Example 68 | Example 69 | Example 70 | Comparative Example 1 |
|---|---|---|---|---|---|
| Formulation | | | | | |
| First Stage of Kneading | | | | | |
| Solution-Polymerized SBR-1 *1 | 100 | 100 | 100 | 100 | 100 |
| Carbon Black-1 N220 *2 | 10 | 10 | 10 | 10 | 10 |
| Silica *3 | 50 | 50 | 50 | 50 | 50 |
| Silane Coupling Agent Si75 *4 | 4.0 | 4.0 | 4.0 | 4.0 | 4.0 |
| Aromatic Oil | 30 | 30 | 30 | 30 | 30 |
| Stearic Acid *5 | — | — | — | — | 2.0 |
| Antiaging Agent 6PPD *7 | 1.0 | 1.0 | 1.0 | 1.0 | 1.0 |
| Second Stage of Kneading | | | | | |
| 1,3-Diphenylguanidine *9 | 1.0 | — | — | — | — |
| Tetrakis(2-ethylhexyl)thiuram Disulfide *22 | — | 1.0 | — | — | — |
| Tetrakis(benzyl)thiuram Disulfide *23 | — | — | 1.0 | — | — |
| Zinc Dibenzyldithiocarbamate *26 | — | — | — | 1.0 | — |
| Final Stage of Kneading | | | | | |
| Stearic Acid *5 | 2.0 | 2.0 | 2.0 | 2.0 | — |
| Antiaging Agent TMDQ *8 | 1.0 | 1.0 | 1.0 | 1.0 | 1.0 |
| Zinc Flower | 2.5 | 2.5 | 2.5 | 2.5 | 2.5 |
| 1,3-Diphenylguanidine *9 | 1.0 | 1.0 | 1.0 | 1.0 | 1.0 |
| Vulcanization Promoter MBTS *10 | 1.0 | 1.0 | 1.0 | 1.0 | 1.0 |
| Vulcanization Promoter TBBS *11 | 0.6 | 0.6 | 0.6 | 0.6 | 0.6 |
| Sulfur | 1.5 | 1.5 | 1.5 | 1.5 | 1.5 |
| Highest Temperature of Rubber Composition in Final Stage of Kneading (° C.) | 105 | 85 | 85 | 115 | 105 |
| Type of Acid Compound Added in First Stage of Kneading | — | — | — | — | *5 |
| *5: Stearic Acid | | | | | |
| Kneading Stage of Acid Compound Addition | Final Stage | Final Stage | Final Stage | Final Stage | First stage |
| Vulcanizate Physical Property: Low-Heat-Generation Property (tanδ index) | 126 | 126 | 126 | 131 | 100 |

TABLE 9

Table 8

| part by mass | Example | | | | | | | | Comparative Example | | | | |
|---|---|---|---|---|---|---|---|---|---|---|---|---|---|
| | 1 | 71 | 72 | 73 | 74 | 75 | 76 | 77 | 1 | 26 | 27 | 28 | 29 |
| Formulation | | | | | | | | | | | | | |
| First Stage of Kneading | | | | | | | | | | | | | |
| Solution-Polymerized SBR-1 *1 | 100 | 75 | 50 | 60 | 90 | 50 | 60 | 90 | 100 | 75 | 50 | 60 | 90 |
| Emulsion-Polymerized SBR-2 *34 | — | 25 | 50 | 40 | 10 | 50 | 40 | 10 | — | 25 | 50 | 40 | 10 |
| Carbon Black-1 N220 *2 | 10 | 10 | 10 | 10 | 10 | 10 | 10 | 10 | 10 | 10 | 10 | 10 | 10 |
| Silica *3 | 50 | 50 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 |
| Stearic Acid *5 | — | — | — | — | — | — | — | — | 2.0 | 2.0 | 2.0 | 2.0 | 2.0 |
| 1,3-Diphenylguanidine *9 | — | — | — | — | — | 1.0 | 1.0 | 1.0 | — | — | — | — | — |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | | | |
| Stearic Acid *5 | 2.0 | 2.0 | 2.0 | 2.0 | 2.0 | 2.0 | 2.0 | 2.0 | — | — | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | 105 | 115 | 115 | 105 | 105 | 85 | 85 | 115 | 105 | 105 | 75 | 75 | 85 |
| Type of Acid Compound Added in First Stage of Kneading *5: Stearic Acid | — | — | — | — | — | — | — | — | *5 | *5 | *5 | *5 | *5 |
| Kneading Stage of Acid Compound Addition | Final Stage | Final Stage | Final Stage | Final Stage | Final Stage | Final Stage | First Stage | First Stage | First Stage | First Stage | First Stage | First Stage | First Stage |
| Vulcanizate Physical Property: Low-Heat-Generation Property (tanδ index) | 115 | 114 | 109 | 111 | 115 | 110 | 115 | 126 | 100 | 100 | 100 | 100 | 100 |

TABLE 10

Table 9

| part by mass | Example | | | | | | | | Comparative Example | | | | | | | |
|---|---|---|---|---|---|---|---|---|---|---|---|---|---|---|---|---|
| | 78 | 79 | 80 | 81 | 82 | 83 | 84 | 85 | 30 | 31 | 32 | 33 | 34 | 35 | 36 | 37 |
| Formaulation | | | | | | | | | | | | | | | | |
| First Stage of Kneading | | | | | | | | | | | | | | | | |
| Solution-Polymerized SBR-1 *1 | 100 | 100 | 100 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 | 10 | 10 | 10 |
| Silica *35 | 50 | 50 | 50 | 50 | 50 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 | 30 | 30 | 30 |
| Stearic Acid *5 | — | — | — | — | — | — | — | — | 2.0 | 2.0 | 2.0 | 2.0 | 2.0 | 2.0 | 2.0 | 2.0 |
| Maleic Acid Monoester *6 | — | — | — | — | — | — | — | — | — | 2.0 | — | 2.0 | — | 2.0 | — | 2.0 |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | | | | | | |
| Stearic Acid *5 | 2.0 | 2.0 | 2.0 | 2.0 | 2.0 | 2.0 | 2.0 | 2.0 | — | — | — | — | — | — | — | — |
| Maleic Acid Monoester *6 | — | 2.0 | — | 2.0 | — | 2.0 | — | 2.0 | — | — | — | — | — | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |

TABLE 10-continued

Table 9

| part by mass | Example | | | | | | | | Comparative Example | | | | | | | |
| --- | --- | --- | --- | --- | --- | --- | --- | --- | --- | --- | --- | --- | --- | --- | --- | --- |
| | 78 | 79 | 80 | 81 | 82 | 83 | 84 | 85 | 30 | 31 | 32 | 33 | 34 | 35 | 36 | 37 |
| Highest Temperature of Rubber Composition in Final Stage of Kneading (° C.) | 105 | 105 | 75 | 75 | 85 | 85 | 115 | 115 | 105 | 105 | 75 | 75 | 85 | 85 | 115 | 115 |
| Type of Acid Compound Added in First Stage of Kneading *5: Stearic Acid *6: Maleic Acid Monoester | — | — | — | — | — | — | — | — | *5 | *5 *6 | *5 | *5 *6 | *5 | *5 *6 | *5 | *5 *6 |
| Kneading Stage of Acid Compound Addition | Final Stage | Final Stage | Final Stage | Final Stage | Final Stage | Final Stage | Final Stage | Final Stage | First Stage | First Stage | First Stage | First Stage | First Stage | First Stage | First Stage | First Stage |
| Vulcanizate Physical Property: Low-Heat-Generation Property (tanδ index) | 117 | 117 | 107 | 106 | 110 | 110 | 117 | 118 | 100 | 98 | 99 | 98 | 99 | 99 | 100 | 100 |

TABLE 11

Table 10

| part by mass | Example | | | | | | | | Comparative Example | | | | | | | |
| --- | --- | --- | --- | --- | --- | --- | --- | --- | --- | --- | --- | --- | --- | --- | --- | --- |
| | 86 | 87 | 88 | 89 | 90 | 91 | 92 | 93 | 38 | 39 | 40 | 41 | 42 | 43 | 44 | 45 |
| Formulation First Stage of Kneading | | | | | | | | | | | | | | | | |
| SolutionPolymerized SBR-1 *1 | 100 | 100 | 100 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 | 10 | 10 | 10 |
| Silica *36 | 50 | 50 | 50 | 50 | 50 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 | 30 | 30 | 30 |
| Stearic Acid *5 | — | — | — | — | — | — | — | — | 2.0 | 2.0 | 2.0 | 2.0 | 2.0 | 2.0 | 2.0 | 2.0 |
| Maleic Acid Monoester *6 | — | — | — | — | — | — | — | — | — | 2.0 | — | 2.0 | — | 2.0 | — | 2.0 |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | | | | | | |
| Stearic Acid *5 | 2.0 | 2.0 | 2.0 | 2.0 | 2.0 | 2.0 | 2.0 | 2.0 | — | — | — | — | — | — | — | — |
| Maleic Acid Monoester *6 | — | 2.0 | — | 2.0 | — | 2.0 | — | 2.0 | — | — | — | — | — | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | 105 | 105 | 75 | 75 | 85 | 85 | 115 | 115 | 105 | 105 | 75 | 75 | 85 | 85 | 115 | 115 |
| Type of Acid Compound Added in First Stage of Kneading *5: Stearic Acid *6: Maleic Acid Monoester | — | — | — | — | — | — | — | — | *5 | *5 *6 | *5 | *5 *6 | *5 | *5 *6 | *5 | *5 *6 |
| Kneading Stage of Acid Compound Addition | Final Stage | Final Stage | Final Stage | Final Stage | Final Stage | Final Stage | Final Stage | Final Stage | First Stage | First Stage | First Stage | First Stage | First Stage | First Stage | First Stage | First Stage |
| Vulcanizate Physical Property: Low-Heat-Generation Property (tanδ index) | 112 | 112 | 105 | 105 | 110 | 110 | 114 | 114 | 100 | 100 | 98 | 98 | 99 | 100 | 100 | 100 |

TABLE 12

Table 11

| part by mass | Example | | | | | | | | Comparative Example | | | | | | | |
|---|---|---|---|---|---|---|---|---|---|---|---|---|---|---|---|---|
| | 94 | 95 | 96 | 97 | 98 | 99 | 100 | 101 | 46 | 47 | 48 | 49 | 50 | 51 | 52 | 53 |
| Formulation | | | | | | | | | | | | | | | | |
| First Stage of Kneading | | | | | | | | | | | | | | | | |
| Solution-Polymerized SBR-1 *1 | 100 | 100 | 100 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 | 10 | 10 | — |
| Silica *37 | 50 | 50 | 50 | 50 | 50 | 50 | 50 | 50 | 50 | 50 | 50 | 50 | 50 | 50 | 50 | — |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 | 30 | 30 | 30 |
| Stearic Acid *5 | — | — | — | — | — | — | — | — | 2.0 | 2.0 | 2.0 | 2.0 | 2.0 | 2.0 | 2.0 | 2.0 |
| Maleic Acid Monoester *6 | — | — | — | — | — | — | — | — | — | 2.0 | — | 2.0 | — | 2.0 | — | 2.0 |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | | | | | | |
| Stearic Acid *5 | 2.0 | 2.0 | 2.0 | 2.0 | 2.0 | 2.0 | 2.0 | 2.0 | — | — | — | — | — | — | — | — |
| Maleic Acid Monoester *6 | — | 2.0 | — | 2.0 | — | 2.0 | — | 2.0 | — | — | — | — | — | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | 105 | 105 | 75 | 75 | 85 | 85 | 115 | 115 | 105 | 105 | 75 | 75 | 85 | 85 | 115 | 115 |
| Type of Acid Compound Added in First Stage of Kneading | — | — | — | — | — | — | — | — | *5 | *5 *6 | *5 | *5 *6 | *5 | *5 *6 | *5 | *5 *6 |
| *5: Stearic Acid | | | | | | | | | | | | | | | | |
| *6: Maleic Acid Monoester | | | | | | | | | | | | | | | | |
| Kneading Stage of Acid Compound Addition | Final Stage | Final Stage | Final Stage | Final Stage | Final Stage | Final Stage | Final Stage | Final Stage | First Stage | First Stage | First Stage | First Stage | First Stage | First Stage | First Stage | First Stage |
| Vulcanizate Physical Property: Low-Heat-Generation Property (tanδ index) | 108 | 109 | 105 | 105 | 106 | 107 | 109 | 111 | 100 | 99 | 97 | 98 | 98 | 99 | 100 | 100 |

TABLE 13

Table 12

| part by mass | Example | | | | | | | | Comparative Example | | | | | | | |
|---|---|---|---|---|---|---|---|---|---|---|---|---|---|---|---|---|
| | 102 | 103 | 104 | 105 | 106 | 107 | 108 | 109 | 54 | 55 | 56 | 57 | 58 | 59 | 60 | 61 |
| Formulation | | | | | | | | | | | | | | | | |
| First Stage of Kneading | | | | | | | | | | | | | | | | |
| Solution-Polymerized SBR-1 *1 | 100 | 100 | 100 | 100 | 100 | 100 | 100 | 100 | 100 | 100 | 100 | 100 | 100 | 100 | 100 | 100 |
| Carbon Black-1 N220 *2 | 10 | 10 | 10 | 10 | 10 | 10 | 10 | 10 | 10 | 10 | 10 | 10 | 10 | 10 | 10 | 10 |
| Silica *38 | 50 | 50 | 50 | 50 | 50 | 50 | 50 | 50 | 50 | 50 | 50 | 50 | 50 | 50 | 50 | 50 |
| Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Aromatic Oil | 30 | 30 | 30 | 30 | 30 | 30 | 30 | 30 | 30 | 30 | 30 | 30 | 30 | 30 | 30 | 30 |
| Stearic Acid *5 | — | — | — | — | — | — | — | — | 2.0 | 2.0 | 2.0 | 2.0 | 2.0 | 2.0 | 2.0 | 2.0 |
| Maleic Acid Monoester *6 | — | — | — | — | — | — | — | — | — | 2.0 | — | 2.0 | — | 2.0 | — | 2.0 |
| Antiaging Agent 6PPD *7 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Final Stage of Kneading | | | | | | | | | | | | | | | | |
| Stearic Acid *5 | 2.0 | 2.0 | 2.0 | 2.0 | 2.0 | 2.0 | 2.0 | 2.0 | — | — | — | — | — | — | — | — |
| Maleic Acid Monoester *6 | — | 2.0 | — | 2.0 | — | 2.0 | — | 2.0 | — | — | — | — | — | — | — | — |
| Antiaging Agent TMDQ *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 1,3-Diphenylguanidine *9 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter MBTS *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization Promoter TBBS *11 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in Final Stage of Kneading (° C.) | 105 | 105 | 75 | 75 | 85 | 85 | 115 | 115 | 105 | 105 | 75 | 75 | 85 | 85 | 115 | 115 |
| Type of Acid Compound Added in First Stage of Kneading | — | — | — | — | — | — | — | — | *5 | *5 *6 | *5 | *5 *6 | *5 | *5 *6 | *5 | *5 *6 |
| *5: Stearic Acid | | | | | | | | | | | | | | | | |
| *6: Maleic Acid Monoester | | | | | | | | | | | | | | | | |

TABLE 13-continued

Table 12

| part by mass | Example | | | | | | | | Comparative Example | | | | | | | |
| --- | --- | --- | --- | --- | --- | --- | --- | --- | --- | --- | --- | --- | --- | --- | --- | --- |
| | 102 | 103 | 104 | 105 | 106 | 107 | 108 | 109 | 54 | 55 | 56 | 57 | 58 | 59 | 60 | 61 |
| Kneading Stage of Acid Compound Addition | Final Stage | Final Stage | Final Stage | Final Stage | Final Stage | Final Stage | Final Stage | Final Stage | First Stage | First Stage | First Stage | First Stage | First Stage | First Stage | First Stage | First Stage |
| Vulcanizate Physical Property: Low-Heat-Generation Property (tanδ index) | 105 | 105 | 102 | 102 | 104 | 104 | 106 | 105 | 100 | 100 | 97 | 97 | 98 | 98 | 99 | 100 |

[Notes]
*1: Asahi Kasei's solution-polymerized styrene-butadiene copolymer rubber (SBR), trade name "Toughden 2000"
*2: N220 (ISAF), Asahi Carbon's trade name "#80"
*3: Tosoh Silica's trade name "Nipseal AQ", BET specific surface area 205 $m^2/g$
*4: Bis(3-triethoxysilylpropyl) disulfide (mean sulfur chain length: 2.35), Evonik's silane coupling agent, trade name "Si75" (registered trademark)
*5: Stearic Acid
*6: Monomalate of maleic acid
*7: N-(1,3-dimehtylbutyl)-N'-phenyl-p-phenylenediamine, Ouchi Shinko Chemical's trade name "Noclac 6C"
*8: 2,2,4-Trimethyl-1,2-dihydroquinoline polymer, Ouchi Shinko Chemical's trade name "Noclac 224"
*9: 1,3-Diphenylguanidine, Sanshin Chemical's trade name "Sanceler D"
*10: Di-2-benzothiazolyl disulfide, Sanshin Chemical's trade name "Sanceler DM"
*11: N-tert-butyl-2-benzothiazolylsulfenamide, Sanshin Chemical's trade name "Sanceler NS"
*12: Valeric acid, Kanto Chemical's reagent
*13: Ascorbic acid, Kanto Chemical's reagent
*14: Catechol, Kanto Chemical's reagent
*15: Phenol, Kanto Chemical's reagent
*16: Phthalic acid, Kanto Chemical's reagent
*17: O-nitrophenol, Kanto Chemical's reagent
*18: M-nitrophenol, Kanto Chemical's reagent
*19: P-nitrophenol, Kanto Chemical's reagent
*20: N-cyclohexyl-2-benzothiazolylsulfenamide, Ouchi Shinko Chemical's trade name "Nocceler CZ"
*21: Ouchi Shinko Chemical's trade name "Nocceler M-P"
*22: Ouchi Shinko Chemical's trade name "Nocceler TOT-N"
*23: Sanshin Chemical's trade name "Sanceler TBZTD"
*24: Sanshin Chemical's trade name "Sanceler TMU"
*25: Ouchi Shinko Chemical's trade name "Nocceler EUR"
*26: Ouchi Shinko Chemical's trade name "Nocceler ZTC"
*27: Sanshin Chemical's trade name "Sanceler PX"
*28: Sanshin Chemical's trade name "Sanceler PZ"
*29: Sanshin Chemical's trade name "Sanceler TT-CU"
*30: Ouchi Shinko Chemical's trade name "Nocceler ZIX-O"
*31: 3-Octanoylthiopropyltriethoxysilane, Momentive Performance Materials' trade name "NXT Silane" (registered trademark)
*32: Silane coupling agent represented by the chemical formula (VII), Momentive Performance Materials' trade name "NXT-Z" (registered trademark)
*33: Silane coupling agent represented by the following average compositional formula and obtained in Production Example 1

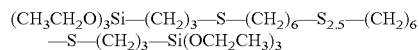

$(CH_3CH_2O)_3Si—(CH_2)_3—S—(CH_2)_6—S_{2.5}—(CH_2)_6—S—(CH_2)_3—Si(OCH_2CH_3)_3$

*34: JSR's emulsion-polymerized styrene-butadiene copolymer rubber (SBR), trade name "#1500"
*35: Tosoh Silica's trade name "Nipseal KQ", BET specific surface area 240 $m^2/g$
*36: Tosoh Silica's trade name "Nipseal NS", BET specific surface area 160 $m^2/g$
*37: Tosoh Silica's trade name "Nipseal NA", BET specific surface area 135 $m^2/g$
*38: Tosoh Silica's trade name "Nipseal ER", BET specific surface area 95 $m^2/g$ As obvious from Table 1 to Table 13, the rubber compositions of Examples 1 to 109 are all better than the comparative rubber compositions of Comparative Examples 1 to 61 in point of the low-heat-generation property (tan δ index).

INDUSTRIAL APPLICABILITY

According to the production method for a rubber composition of the present invention, it is possible to obtain a rubber composition excellent in low-heat-generation property with successfully inhibiting the coupling function activity of the silane coupling agent used from lowering and with further increasing the coupling function activity thereof, and is therefore favorably used as a production method for constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:
1. A method for producing a rubber composition containing a rubber component (A) of at least one selected from natural rubbers and synthetic dienic rubbers, an inorganic filler (B), a silane coupling agent (C) and an acidic compound (D),
   wherein the rubber composition is kneaded in multiple stages, and in the final stage of kneading, the acidic compound (D) is added, and the highest temperature of the rubber composition in the final stage of kneading is from 60 to 120° C.,
   wherein the highest temperature of the rubber composition in the first stage of kneading is from 140 to 190° C., and
   wherein the rubber component (A), all or a part of the inorganic filler (B) and all or a part of the silane coupling agent (C) are kneaded in the first stage of kneading, and on the way of the first stage, a vulcani- zation promoter (E) is added after an elapsed time of 60 to 90 seconds from adding the silane coupling agent (C) and further kneaded.

2. The method for producing a rubber composition according to claim 1, wherein the highest temperature of the rubber composition in the final stage of kneading is from 100 to 120° C.

3. The method for producing a rubber composition according to claim 1, wherein the acidic compound (D) is a fatty acid.

4. The method for producing a rubber composition according to claim 3, wherein the fatty acid is stearic acid.

5. The method for producing a rubber composition according to claim 1, wherein in the stage before the final stage of kneading, at least one vulcanization promoter (E) selected from guanidines, sulfenamides, thiazoles, thiurams, dithiocarbamate salts, thioureas and xanthate salts is added.

6. The method for producing a rubber composition according to claim 1, wherein the silane coupling agent (C) is at least one compound selected from a group of compounds represented by the following general formulae (I) to (IV):

$$(R^1O)_{3-p}(R^2)_p Si—R^3—S_a—R^3—Si(OR^1)_{3-r}(R^2)_r \quad (I)$$

(wherein multiple $R^1$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^2$'s may be the same or different, each representing a linear, cyclic or branched alkyl group having from 1 to 8 carbon atoms; multiple $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time);

[Chemical Formula 2]

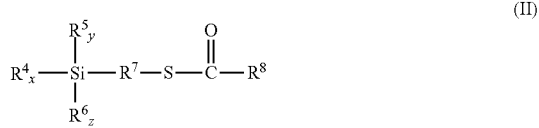

(II)

(wherein $R^4$ represents a monovalent group selected from —Cl, —Br, $R^9O$—, $R^9C$(—O)O—, $R^9R^{10}C$—NO—, $R^9R^{10}CNO$—, $R^9R^{10}N$—, and —(OSi $R^9R^{10}$)$_h$(OSi $R^9R^{10}R^{11}$) (where $R^9$, $R^{10}$ and $R^{11}$ each represents a hydrogen atom or a monovalent hydrocarbon group having from 1 to 18 carbon atoms; and h indicates from 1 to 4 as a mean value); $R^5$ represents $R^4$, a hydrogen atom, or a hydrocarbon group having from 1 to 18 carbon atoms; $R^6$ represents $R^4$, $R^5$, a hydrogen atom, or a group —[O($R^{12}$O)$_j$]$_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicates a number satisfying the relationship of x+y+2z=3, 0≤x≤3, 0≤y≤2, 0≤z≤1);

$$(R^{13}O)_{3-s}(R^{14})_s Si—R^{15}—S_k—R^{16}—S_k—R^{15}—Si(OR^{13})_{3-t}(R^{14})_t \quad (III)$$

(wherein multiple $R^{13}$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^{14}$'s may be the same or different, each representing a linear, cyclic or branched alkyl group having from 1 to 8 carbon atoms; multiple $R^{15}$'s may be the same or different, each representing a linear or branched alkylene group having from 1 to 8 carbon atoms; $R^{16}$ represents a divalent group of a general formula (—S—$R^{17}$—S—), (—$R^{18}$—$S_{m1}$—$R^{19}$—) or (—$R^{20}$—$S_{m2}$—$R^{21}$—$S_{m3}$—$R_{22}$—) (where $R^{17}$ to $R^{22}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); multiple k's may be the same or different, each indicating from 1 to 6 as a mean value; s and t each indicates from 0 to 3 as a mean value, provided that both s and t are not 3 at the same time);

[Chemical Formula 4]

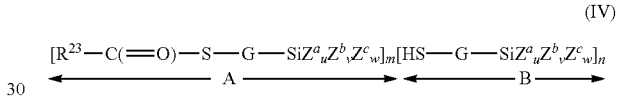

(IV)

(wherein $R^{23}$ represents a linear, branched or cyclic alkyl group having from 1 to 20 carbon atoms; multiple G's may be the same or different, each representing an alkanediyl group or an alkenediyl group having from 1 to 9 carbon atoms; multiple $Z^a$'s may be the same or different, each representing a functional group capable of bonding to the two silicon atoms and selected from [—O—]$_{0.5}$, [—O-G-]$_{0.5}$ and [—O-G-O—]$_{0.5}$; multiple $Z^b$'s may be the same or different, each representing a functional group capable of bonding to the two silicon atoms and represented by [—O-G-O-]$_{0.5}$; multiple $Z^c$'s may be the same or different, each representing a functional group selected from —Cl, —Br, —OR$^a$, R$^a$C(═O)O—, R$^a$R$^b$C═NO—, R$^a$R$^b$N—, R$^a$— and HO-G-O— (where G is the same as above); R$^a$ and R$^b$ each represents a linear, branched or cyclic alkyl group having from 1 to 20 carbon atoms; m, n, u, v and w each are 1≤m≤20, 0≤n≤20, 0≤u≤3, 0≤v≤2, 0≤w≤1, and (u/2)+v+2w is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's).

7. The method for producing a rubber composition according to claim 5, wherein the guanidine is at least one compound selected from 1,3-diphenylguanidine, 1,3-di-o-tolylguanidine and 1-o-tolylbiguanide.

8. The method for producing a rubber composition according to claim 5, wherein the sulfenamide is N-cyclohexyl-2-benzothiazolylsulfenamide and/or N-tert-butyl-2-benzothiazolylsulfenamide.

9. The method for producing a rubber composition according to claim 5, wherein the thiazol is at least one compound selected from 2-mercaptobenzothiazole and di-2-benzothiazolyl disulfide.

10. The method for producing a rubber composition according to claim 5, wherein the thiuram is at least one compound selected from tetrakis(2-ethylhexyl)thiuram disulfide and tetrabenzylthiuram disulfide.

11. The method for producing a rubber composition according to claim 5, wherein the thiourea is at least one compound selected from N,N'-diethylthiourea, trimethylthiourea, N,N'-diphenylthiourea and N,N'-dimethylthiourea.

12. The method for producing a rubber composition according to claim 5, wherein the dithiocarbamate salt is at least one compound selected from zinc dibenzyldithiocarbamate, zinc N-ethyl-N-phenyldithiocarbamate, zinc dimethyldithiocarbamate and copper dimethyldithiocarbamate.

13. The method for producing a rubber composition according to claim 5, wherein the xanthate salt is zinc isopropylxanthate.

14. A rubber composition produced according to the rubber composition production method of claim 1.

15. A tire using the rubber composition of claim 14.

16. The method for producing a rubber composition according to claim 1, wherein a synthetic rubber produced according to a solution polymerization method accounts for at least 70% by mass of the rubber component (A).

17. The method for producing a rubber composition according to claim 1, wherein the vulcanization promoter (E) is at least one compound selected from tetrakis(2-ethylhexyl)thiuram disulfide and tetrabenzylthiuram disulfide.

18. The method for producing a rubber composition according to claim 1, wherein the vulcanization promoter (E) is at least one compound selected from zinc dibenzyldithiocarbamate, zinc N-ethyl-N-phenyldithiocarbamate, zinc dimethyldithiocarbamate and copper dimethyldithiocarbamate.

19. The method for producing a rubber composition according to claim 18, wherein the vulcanization promoter (E) is zinc dibenzyldithiocarbamate.

* * * * *